United States Patent
McLintock (10) Patent No.: US 7,372,456 B2
(45) Date of Patent: May 13, 2008

(54) METHOD AND APPARATUS FOR CALIBRATING AN INTERACTIVE TOUCH SYSTEM

(75) Inventor: Kevin S. McLintock, Calgary (CA)

(73) Assignee: Smart Technologies Inc. (CA)

( * ) Notice: Subject to any disclaimer, the term of this patent is extended or adjusted under 35 U.S.C. 154(b) by 651 days.

(21) Appl. No.: 10/885,236

(22) Filed: Jul. 7, 2004

(65) Prior Publication Data

US 2006/0007177 A1    Jan. 12, 2006

(51) Int. Cl.
  *G06F 3/041* (2006.01)
(52) U.S. Cl. .................................. 345/173; 178/18.01
(58) Field of Classification Search ........ 345/173–178; 178/18.01–18.11
  See application file for complete search history.

(56) References Cited

U.S. PATENT DOCUMENTS 3,906,190 A * 9/1975 Light ........................ 708/830
6,747,636 B2   6/2004 Martin

FOREIGN PATENT DOCUMENTS

WO     WO 96/24923      8/1996
WO     WO 02/03316 A1   1/2002

* cited by examiner

*Primary Examiner*—Alexander Eisen
*Assistant Examiner*—Kenneth B Lee
(74) *Attorney, Agent, or Firm*—Katten Muchin Rosenman LLP (57) ABSTRACT

A method of calibrating an interactive touch system includes moving a pointer along at least one path on a touch surface over a calibration image presented on the touch surface. Pointer coordinates are generated generally continuously during the tracing representing pointer contact locations on the touch surface. The coordinate system of the touch surface is mapped to the coordinate system of the calibration image using the pointer coordinates and the calibration image.

64 Claims, 11 Drawing Sheets

METHOD AND APPARATUS FOR CALIBRATING AN INTERACTIVE TOUCH SYSTEM

FIELD OF THE INVENTION

The present invention relates generally to interactive touch systems and in particular to a method and apparatus for calibrating an interactive touch system.

BACKGROUND OF THE INVENTION

Interactive touch systems are well known in the art and typically include a touch screen having a touch surface on which contacts are made using a pointer in order to generate user input. Pointer contacts with the touch surface are detected and are used to generate corresponding output based on the locations of contact. There are basically two general types of touch systems available and they can be broadly classified as "active" touch systems and "passive" touch systems.

Interactive touch systems have a number of applications relating to computer operation and video display. For example, U.S. Pat. No. 5,448,263 to Martin, assigned to SMART Technologies Inc., assignee of the present invention, discloses a passive touch system including a touch screen coupled to a computer. The computer display is projected on to the touch surface of the touch screen via an imaging device such as a projector. The coordinates representing specific locations on the touch surface are mapped to the coordinate system of the computer display. When a user contacts the touch surface of the touch screen, coordinate data is generated by the touch screen and fed to the computer. The computer maps the received coordinate data to the computer display thereby allowing the user to operate the computer in a manner similar to using a computer mouse simply by contacting the touch surface. Furthermore, the coordinate data fed back to the computer can be recorded in an application and redisplayed at a later time. Recording the coordinate data generated in response to user contacts is typically done when it is desired to record information written or drawn on the touch surface by the user.

As the projector is separate from the touch surface of the touch screen, steps must be taken to calibrate the touch system thereby to align the projected image of the computer display with the coordinate system of the touch screen. During calibration, calibration marks are projected on to the touch surface and the user is prompted to contact the touch surface at the calibration mark locations resulting in coordinate data being generated. Since the coordinates of the calibration marks in the computer display coordinate system are known, the coordinate data generated by the touch screen in response to the user contacts at the calibration mark locations can be used to map the coordinate system of the touch screen to the computer display coordinate system. This calibration process corrects for projector/touch surface misalignment, and compensates for scale, skew, rotation and keystone distortion.

Contacting the touch surface at least at three calibration mark locations is required to accurately correct for scale, skew and rotational misalignment of a projected image with a planar touch surface. Contacting the touch surface at least at four discrete calibration mark locations is required to accurately correct for keystone distortion. Keystone distortion is generally the result of non-orthogonal axial misalignment between the imaging device used to project the image and the touch surface. Contacting the touch surface at more than four calibration mark locations during the calibration process provides for more robust calibration of the touch system.

It is common for interactive touch systems to have calibration processes requiring user input at up to eighty-one (81) calibration mark locations. Such a calibration process provides a high degree of accuracy but can be quite time consuming and laborious, since care must be taken to contact the touch surface at the exact location of each displayed calibration mark. If the imaging device or touch surface is bumped or moved, the entire calibration process may need to be repeated. As will be appreciated a calibration process for interactive touch systems that can be performed quickly and easily is desired.

Therefore, it is an object of the present invention to provide a novel method and apparatus for calibrating an interactive touch system.

SUMMARY OF THE INVENTION

Accordingly, in one aspect of the present invention there is provided a method of calibrating an interactive touch system comprising:

moving a pointer along at least one path on a touch surface over a calibration image presented on said touch surface;

generating pointer coordinates generally continuously during pointer movement representing pointer contact locations on said touch surface; and mapping the coordinate system of the touch surface to the coordinate system of the calibration image using said pointer coordinates and said calibration image.

The calibration image may include at least one demarcation providing visual guidance with respect to the at least one path along which the pointer is moved. In one embodiment, the demarcation is at least one line to be traced using the pointer. The at least one line may be straight or curved.

In response to the mapping a calibrated touch surface coordinate system may be generated and stored in memory. Feedback may be provided during tracing indicating the degree of calibration of the touch surface coordinate system. The feedback may be a highlighted path provided in the calibration image representing the perceived path of the pointer in the calibration image coordinate system.

According to another aspect of the present invention, there is provided a method of calibrating an interactive touch system comprising:

displaying a calibration image on a touch surface, said calibration image specifying at least one path to be traced using a pointer;

moving the pointer along the specified at least one tracing path;

generating pointer coordinates generally continuously during said tracing representing pointer contact locations on said touch surface;

mapping the coordinate system of the touch surface to the coordinate system of the calibration image using said pointer coordinates and said calibration image to calibrate the touch surface coordinate system; and providing feedback indicating the degree of calibration between the touch surface coordinate system and the calibration image coordinate system.

According to yet another aspect of the present invention, there is provided a touch system comprising:

a touch screen having a surface on which pointer contacts are made, said touch screen generating pointer coordinates in response to pointer contacts thereon;

a computing device coupled to said touch screen and receiving pointer coordinates generated thereby; and a projection device coupled to said computing device, said projection device receiving display output from said computing device and projecting an image that is presented on said surface, wherein said computing device is operable to perform a calibration process, during said calibration process said computing device:

providing display output to said projection device causing said projection device to project a calibration image on said surface, said calibration image being within the boundary of said surface and including at least one visual demarcation providing a guide with respect to at least one path to be traced across said surface;

receiving the pointer coordinates during tracing along said at least one path; and processing the pointer coordinates using the calibration image to map the touch screen coordinate system to the display output coordinate system thereby to calibrate said touch system.

The present invention provides advantages in that a reduced number of pointer contacts with the touch surface are required to calibrate the touch system. When visual feedback is provided, the user is able to see the results of the calibration in real-time allowing the user to terminate the calibration process whenever the degree of calibration is deemed to be acceptable. The effectiveness of the calibration process is enhanced by using attributes of the traced path such as slope, intersection points and start and end paths.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
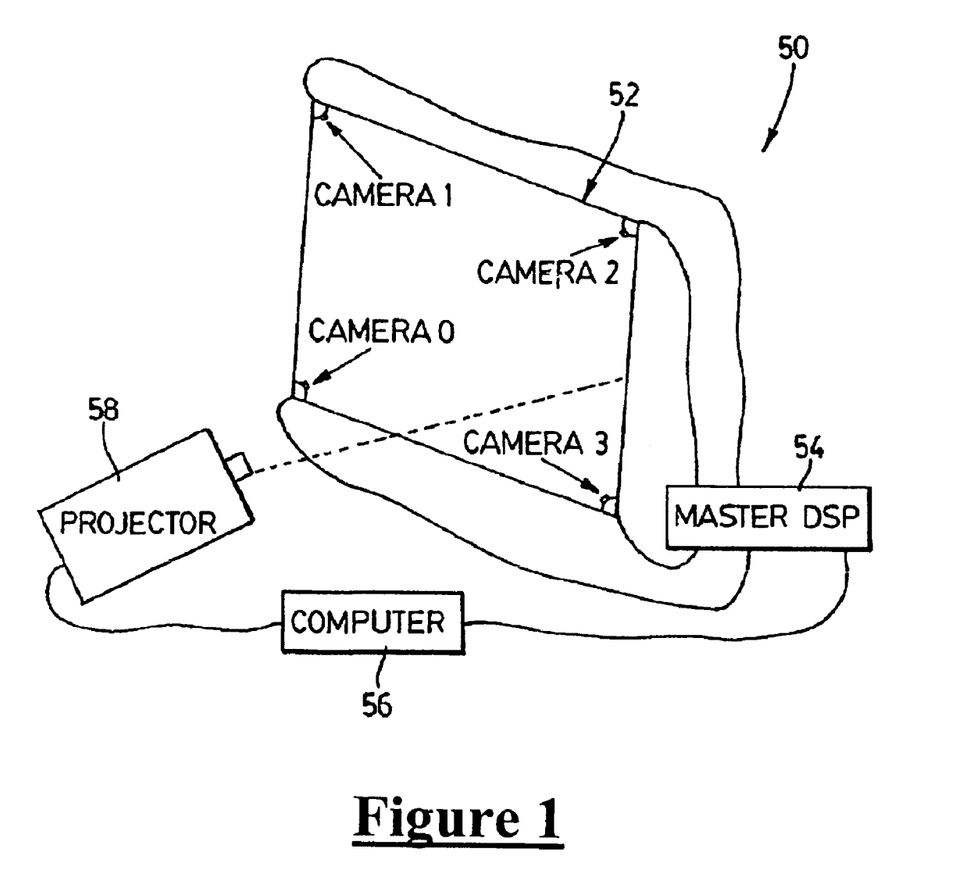
FIG. 1 is a schematic diagram of an interactive touch system in accordance with the present invention.

Turning now to FIG. 1, a camera-based interactive touch system such as that described in International PCT Application No. WO 02/03316 filed on Jul. 5, 2001, assigned to SMART Technologies Inc., assignee of the present invention, the content of which is incorporated herein by reference, is shown and is generally identified by reference numeral 50. As can be seen, interactive touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts on the touch screen 52 using an input device 68 (see FIG. 6) can be recorded as writing or drawing or used to control execution of application programs executed by the computer 56. The input device 68 may be any suitable device such as for example a user's hand or finger, a stylus, a marker, a pen, a pointer stick, a laser pointer, a retro-reflective pointer, a light pen, or other appropriate device (collectively referred to hereinafter as "pointer").

Figures 2, 3:
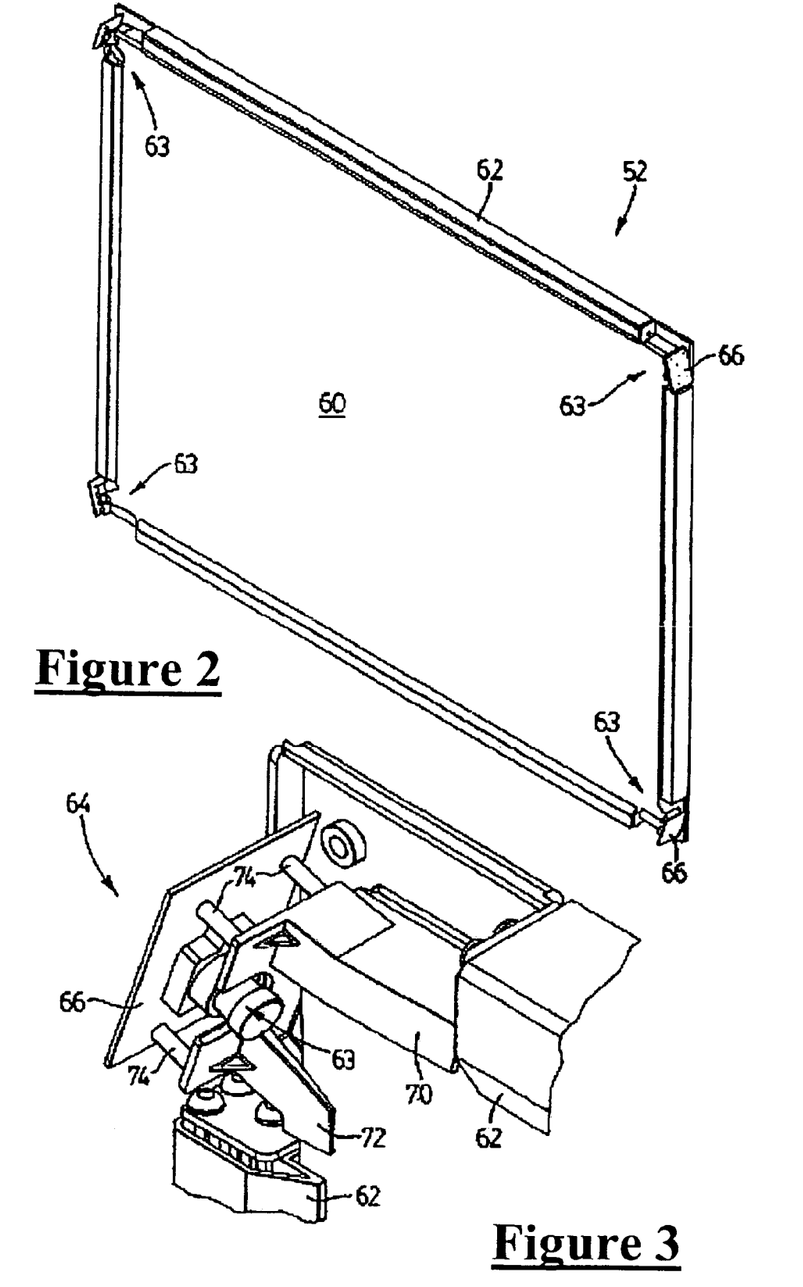
FIG. 2 is an isometric view of a touch screen forming part of the interactive touch system of FIG. 1.
FIG. 3 is an isometric view of a corner portion of the touch screen of FIG. 2.
Figure 4:
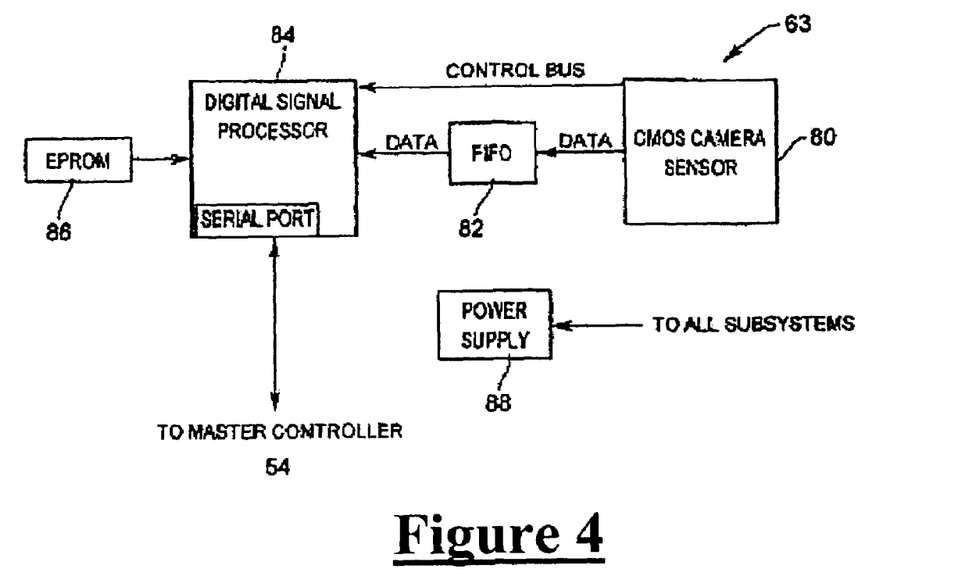
FIG. 4 is a schematic diagram of a camera assembly forming part of the touch screen of FIG. 2.

FIGS. 2 to 4 better illustrate the touch screen 52. Touch screen 52 includes a touch surface 60 bordered by a rectangular frame or bezel 62. Bezel 60 may be of the illuminated type such as that described in U.S. patent application Ser. No. 10/354,168 filed on Jan. 30, 2003 to Akitt et al., assigned to SMART Technologies Inc., assignee of the present invention, the content of which is incorporated herein by reference. Touch surface 60 is in the form of a rectangular, generally planar sheet of passive material. DSP-based CMOS digital cameras $63_0$ to $63_3$ are positioned adjacent each corner of the touch screen 52. Each digital camera $63_N$ is mounted on a frame assembly 64 including an angled support plate 66 on which the digital camera $63_N$ is mounted. Supporting frame elements 70 and 72 are mounted on the plate 66 by way of posts 74 and secure the plate 66 to the frame 62.

Each digital camera $63_N$ includes a two-dimensional CMOS image sensor 80 having an associated lens assembly, a first-in-first-out (FIFO) buffer 82 coupled to the image sensor 80 by a data bus and a digital signal processor (DSP) 84 coupled to the FIFO 82 by a data bus and to the image sensor 80 by a control bus. A boot EPROM 86 and a power supply subsystem 88 are also included.

In the present embodiment, the CMOS camera image sensor 80 is of the type manufactured by National Semiconductor under Patent No. LM9617 and includes a 640×20 pixel subarray that can be operated to capture image frames at rates in excess of 200 frames per second. Arbitrary pixel rows of the image sensor 80 can be selected. Since the pixel rows can be arbitrarily selected, the pixel subarray can be exposed for a greater duration for a given digital camera frame rate providing for good operation in darker rooms in addition to well lit rooms. The FIFO buffer 82 is manufactured by Cypress under part number CY7C4211V and the DSP 84 is manufactured by Analog Devices under part number ADSP2185M.

The DSP 84 receives image frames from the image sensor 80 and processes the image frames to determine the x-positions of a pointer within the image frames. In addition, the DSP 84 provides control information to the image sensor 80 via the control bus. The control information allows the DSP 84 to control parameters of the image sensor 80 such as exposure, gain, array configuration, reset and initialization. The DSP 84 also provides clock signals to the image sensor 80 to control the frame rate of the image sensor 80.

The angle of the plate 66 and the optics of each digital camera $63_N$ are selected so that the field of view (FOV) of each digital camera $63_N$ is slightly beyond 90°. In this way, the entire touch surface 60 is within the field of view of each digital camera $63_N$ with the field of view of each digital camera $63_N$ extending slightly beyond a designated peripheral edge of the touch surface 60.

Figure 5:
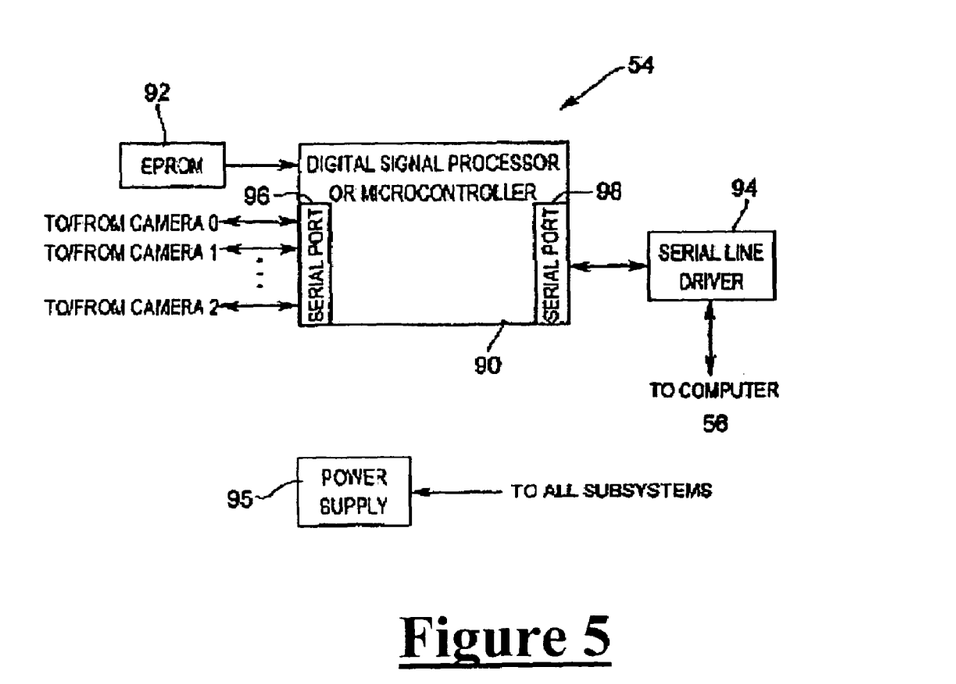
FIG. 5 is a schematic diagram of a master controller forming part of the touch screen of FIG. 2.

Master controller 54 is best illustrated in FIG. 5 and includes a DSP 90, a boot EPROM 92, a serial line driver 94 and a power supply subsystem 95. The DSP 90 communicates with the DSPs 84 of the digital cameras $63_0$ to $63_3$ over a data bus via a serial port 96 and communicates with the computer 56 over a data bus via a serial port 98 and the serial line driver 94. In this embodiment, the DSP 90 is manufactured by Analog Devices under part number ADSP2185M. The serial line driver 94 is manufactured by Analog Devices under part number ADM222.

The master controller 54 and each digital camera $63_N$ follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras $63_0$ to $63_3$ and to the DSP 90 in the master controller 54 and the remaining two (2) channels are unused. The master controller 54 monitors the twenty-four (24) channels assigned to the DSPs 84. The DSPs 84 monitor the six (6) channels assigned to the DSP 90 of the master controller 54. Communications between the master controller 54 and the digital cameras $63_0$ to $63_3$ are performed as background processes in response to interrupts.

During operation of the touch system 50, each digital camera $63_N$ acquires image frames of the touch surface 60 within the field of view of its image sensor 80 at a desired frame rate and processes each acquired image frame to determine if a pointer is in the acquired image frame. During this operation, the DSP 84 reads each image frame from the FIFO buffer 82 and processes the image frame.

If a pointer is in the acquired image frame, the image frame is further processed by the DSP 84 to determine the x-position of the pointer 68. The z-position of the pointer is also determined so that a determination can be made as to whether the pointer is contacting or hovering above the touch surface 60. Pointer information packets (PIPs) including the pointer position data, status and/or diagnostic information are then generated by the DSP 84 and the PIPs are queued for transmission to the master controller 54. The digital cameras $63_0$ to $63_3$ also receive and respond to command PIPs generated by the master controller 54.

The master controller 54 polls the digital cameras $63_0$ to $63_3$ for PIPs in the queues. In this particular embodiment, the master controller 54 polls the digital cameras $63_N$ at a rate exceeding the image sensor frame rates. Upon receipt of PIPs from the digital cameras $63_N$, the master controller 54 examines the PIPs to determine if the PIPs include pointer position data. If the PIPs include pointer position data, the master controller 54 triangulates the pointer position data in the PIPs to determine the position of the pointer relative to the touch surface 60 in Cartesian rectangular coordinates.

The master controller 54 in turn transmits calculated pointer coordinates, status and/or diagnostic information to the computer 56. In this manner, the pointer coordinates transmitted to the computer 56 can be recorded as writing or drawing or can be used to control execution of application programs executed by the computer 56. The computer 56 also updates the display output conveyed to the projector 58 so that image presented on the touch surface 60 reflects the pointer activity.

The master controller 54 also receives commands from the computer 56 and responds accordingly as well as generates and conveys command PIPs to the digital cameras $63_N$. Specifics of the manner in which the cameras $63_N$ determine the pointer x and z positions from the image frame data and create PIPs is described in International PCT Application No. WO 02/03316 referenced previously and therefore, will not be described herein.

During set up of the touch system 50, the projector 58 is positioned and aligned such that the computer display output that is projected on to the touch surface 60 by the projector 58 falls within the bezel 62. A calibration process is also performed to align the coordinate system of the touch screen 52 with the coordinate system of the image projected on to the touch surface 60, so that pointer coordinates generated by the touch screen 52 in response to a user contact on a point of the image projected on to the touch surface 60, correspond with the coordinates of the image point in the computer display coordinate system.

Figure 6:
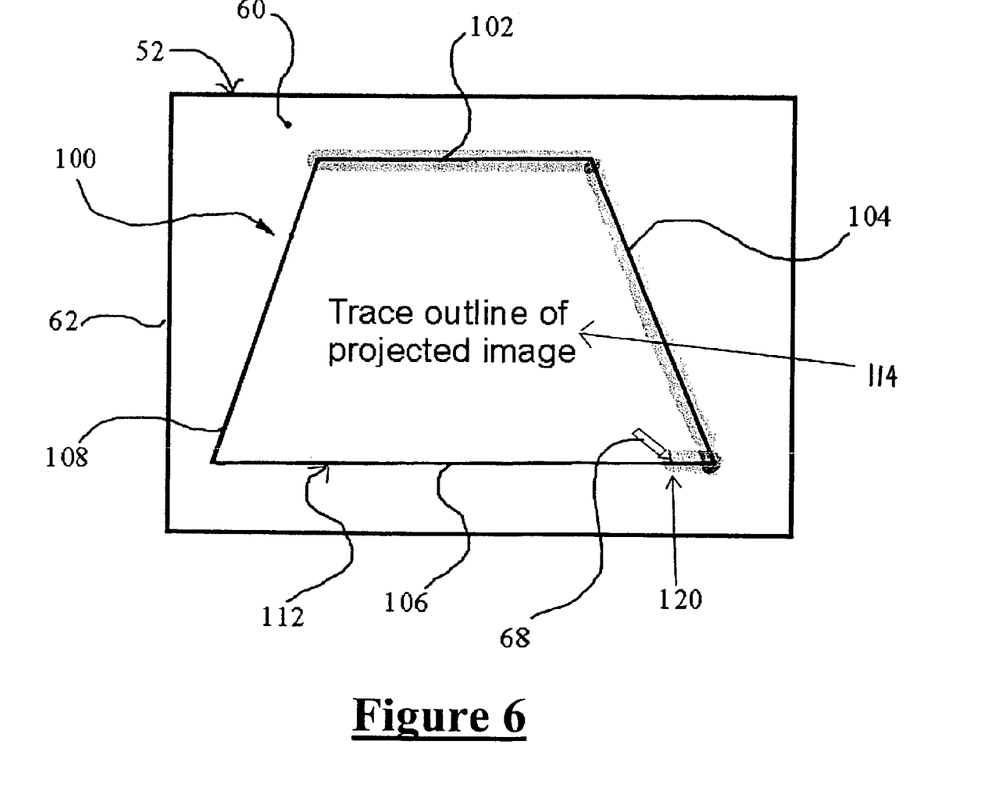
FIG. 6 shows one embodiment of a calibration image projected on to the touch surface of the touch screen during calibration.

The calibration process used to calibrate the touch system 50 will now be described with particular reference to FIG. 6. During calibration, the computer 54 generates a calibration image 100 which is projected on to the touch surface 60 by the projector 58. The calibration image 100 lies completely within the bezel 62.

If the projector 58 and touch screen 52 are misaligned, the projected calibration image 100 may be scaled, skewed, rotated and/or suffer from keystone distortion and thus, as a result may appear trapezoidal on the touch surface 60. In FIG. 6, the calibration image 100 is rectangular but is illustrated as suffering from keystone distortion and thus, has a trapezoidal appearance. As a result, the rectangular calibration image 100 is shown as including a compressed top edge 102, a counter-clockwise rotated right edge 104, an elongated bottom edge 106, and a clockwise rotated left edge 108. The perimeter or border of the calibration image 100 defines a tracing path 112 that is used to calibrate the touch system 50 and map the coordinate system of the touch screen 52 to the computer display coordinate system.

The calibration image 100 further includes text instructions 114 providing direction to the user to assist the user during the calibration process. Initially during calibration, first text instructions are presented on the touch surface 60 directing the user to contact the touch surface 60 with a pointer 68 at a location of their choosing along the perimeter of the calibration image 100. FIG. 6 shows the initial contact occurring at the top left corner of the calibration image 100.

Once contact is detected with the touch surface 60, second text instructions are presented on the touch surface 60 directing the user to use the pointer 68 to trace a path along the perimeter of the calibration image 100, while maintaining continuous contact between the pointer 68 and the touch surface 60, until at least one full loop around the perimeter of the calibration image 100 has been completed. As will be appreciated, during pointer movement along the tracing path 112, the calibration image 100 does not change or require updating.

As the user traces a path along the perimeter of the calibration image 100, the touch screen 52 generates pointer coordinate data corresponding to the locations where the pointer contacts are made. The computer 56 receives the pointer coordinate data and processes the pointer coordinate data to map the computer display coordinate system with the coordinate system of the touch screen 52. With the mapping complete, the calibrated touch screen coordinate system is stored by the computer 56 and is used by the computer 56 during normal operation of the touch system 50 to interpret pointer coordinates generated by the touch screen 52 in response to user contacts on the touch surface 60.

In particular, the computer 56 processes the pointer coordinate data based on known properties of the tracing path 112. These properties may include the native geometry, aspect ratio, and resolution of the calibration image 100 or elements of the calibration image. The nature of the projector 58 may also affect the properties of the observed calibration image. A typical projector will produce a rectangular image on a plane normal to the axis of the lens (assuming that the projector is not configured to project at an angular offset). The geometry of the projected image will typically be either a 4:3 ratio, or a 16:9 ratio, with resolutions ranging from 640×480 to 1280×720. Of course, the calibration process can be used with different aspect ratios and with resolutions beyond the above noted range.

Some assumptions assist in determining on which side (top, bottom, left, right) of the calibration image 100 the user is tracing. It can generally be assumed that a user will closely follow the tracing path 112 using the pointer 68 in an attempt to properly calibrate the touch system 50. The slope of the top or bottom edge 102, 106 of the calibration image 100 should be closer to horizontal than the slope of the left or right edge 104, 108. Likewise, the slope of the right or left edge 104, 108 of the calibration image 100 should be closer to vertical than that of the top or bottom edge 102, 106. One will recognize that a calibration image where this is not the case would be highly distorted and likely unusable.

During the tracing process, the transition between pointer movement along two adjacent sides of the tracing path 112 is apparent from the pointer coordinate data generated by the touch screen 52 and reported to the computer 56. Examining the history of reported pointer coordinates clearly indicates the transition from one side of the tracing path to another. The transition between two adjacent sides of the tracing path 112 will be characterized by an inflection point, whereby the slope of contiguous pointer coordinates abruptly changes. In this example, the inflection points designate the corners of the calibration image 100 allowing the coordinate of the corners to be extracted. The sequence and relative order of each inflection point during the continuous tracing process can also assist in revealing to which corner it belongs.

The computer 56 may use for example traditional perspective geometry techniques such as plane to plane homography to determine the correct mapping of the touch screen coordinate system to the coordinate system of the projected calibration image 100, or may employ more complex artificial intelligence techniques.

After calibration, the location of contact between the pointer 68 and the touch surface 60 will correspond with mouse or script input at the same location within the observed calibration image 100. To enable a high degree of accuracy, the resolution of the touch screen coordinate system should be at least equal to the resolution of the observed calibration image 100. Increased resolution of the touch screen coordinate input system over that of the observed calibration image 100 can provide sub-pixel accuracy for user input.

One will recognize that the above calibration process provides a greatly increased amount of pointer coordinate data as compared to prior art systems that require users to contact the touch surface at numerous discrete calibration mark locations. This is due to the fact that the continuos movement of the pointer 68 along the tracing path 112 is tracked. Each pointer coordinate output by the touch screen 52 during tracing may be used during calibration of the touch screen coordinate system with the coordinate system of the projected calibration image 100. The pointer coordinates output by the touch screen 52 provide even more data when taken in combination with attributes of the tracing path such as for example, slope information extracted from the pointer coordinates. For example, the slope of a side of the tracing path 112 in conjunction with pointer coordinates gathered over some or all of the length of the side, may provide a more accurate correlation between the traced path of the pointer 68 and the tracing path 112 in the calibration image 100.

Although the inflection points may be used to designate corners of the calibration image 100, those of skill in the art will appreciate that using a calibration image having discrete corner coordinates is not absolutely necessary. Also, those of skill in the art will appreciate that there may be cases where the inflection points do not represent the true corners of the calibration image 100 (due to poor tracing for example).

If desired, visual feedback may be provided to the user during the calibration process. In this case, when the user first contacts the touch surface 60 with the pointer 68 and the touch screen 52 outputs the pointer coordinates to the computer 56, a real-time visual cue 120, in this example highlighting, is injected into the calibration image reflecting the perceived location of the pointer contact with the calibration image 100. As the user proceeds to move the pointer 68 along the tracing path 112 and more pointer coordinates are generated, the computer 56 learns more about the geometry of the calibration image 100 and hence, is able to generate a more accurate mapping between the touch screen and computer display coordinate systems. As the user continues moving the pointer 68 along the tracing path 112, the location of the visual cue 120 is updated throughout the calibration process based on the corrections made to the calibrated touch screen coordinate system. Thus, as the user progresses to move the pointer along the tracing path 112 and the calibrated touch screen coordinate system is refined, the degree of alignment between the visual cue 120 and the calibration image 100 improves.

As calibration pointer coordinate data is being generally continuously generated as the user moves the pointer 68 along the tracing path 112, an acceptable degree of calibration may be achieved before a complete loop around the calibration image 100 is made. In this instance, by using real-time visual feedback provided to the user, the calibration process may be terminated at any time the user determines that an acceptable degree of calibration has been achieved. There may also be cases where the degree of calibration is not acceptable after one complete tracing along the perimeter of the calibration image 100. With real-time visual feedback, the user can acknowledge that further calibration is required, and can continue tracing along the perimeter of the calibration image 100 uninterrupted until a sufficient degree of calibration is achieved.

As will be appreciated by those of skill in the art, an improved calibration process is achieved which requires the user to make only one contact with the touch surface using a pointer and move the pointer continuously along a guided tracing path.

Figure 7:
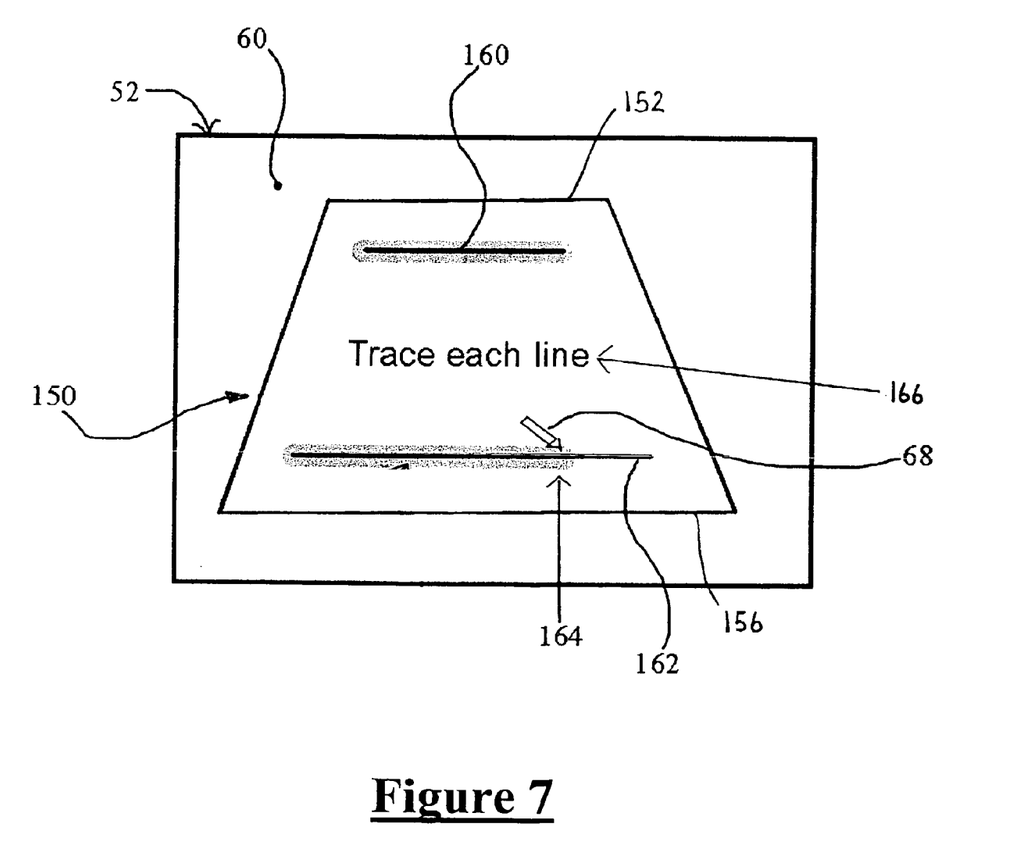
FIG. 7 shows another embodiment of a calibration image projected on to the touch surface of the touch screen during calibration.

FIG. 7 shows an alternate calibration image 150 for display during the calibration process. In this example, the rectangular calibration image similarly suffers from keystone distortion and thus, appears trapezoidal. In addition to its perimeter the calibration image 150 includes a pair of vertically spaced, horizontal lines 160 and 162. Line 160 extends horizontally near the top edge 152 of the calibration image 150. Line 162 extends horizontally near the bottom edge 156 of calibration image 150. The geometry of the lines 160, 162 on the touch surface 60 will depend on the alignment of the touch screen 52 with the normal axis of the projector 58.

Text instructions 166 direct the user to trace a path along each of the projected lines 160,162. The user may be directed as to which line should be traced first, or from which side to begin. However, from the previous discussion, one of skill in the art will recognize that these directions are not absolutely necessary.

As described above, during tracing along the lines 160, 162, pointer coordinates are continuously reported by the touch screen 52 to the computer 56. As a result of tracing each line, sufficient pointer coordintate data becomes available to extract the geometry of the lines 160, 162 with respect to the touch screen coordinate system. Each line also provides slope information, as well as discrete beginning and end points. The beginning and end points of each line may be processed to create discrete points or connected to create virtual vertical lines. Depending on the geometry of the calibration image 150, the discrete locations of the end points may not be required to accurately map the touch screen coordinate system to the coordinate system of the calibration image 150.

As with the previous embodiment, visual feedback may be provided to the user as the user traces along the lines 160, 162 to indicate visually the perceived position of the pointer 68 relative to the calibration image 150. Utilizing the visual feedback, the user continues to trace each line 160, 162, alternately and/or repeatedly, until a sufficient degree of calibration is achieved. Similar to the previous embodiment, the visual feedback is a visual cue 164, again highlighting, injected into the calibration image 150 that tracks movement to the pointer 68 along the touch surface 60.

When tracing a path or paths defined by the calibration image during the calibration process, there may be some ambiguity as to where exactly a user is to make contact with the touch surface 60. Users may trace inside of, outside of, or on directly overlapping elements of the tracing path or paths. By utilizing sufficiently complex tracing paths and/or visual cues, these ambiguities can be resolved and better calibration achieved.

Figure 8:
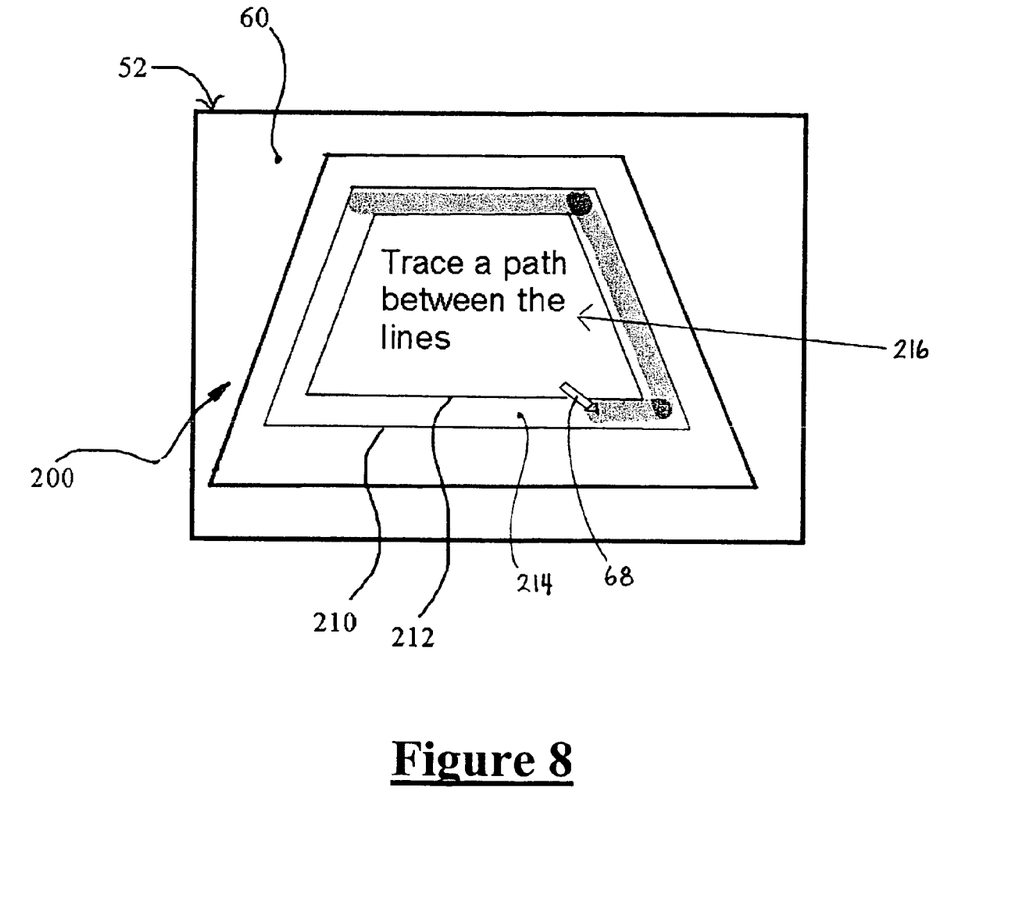
FIG. 8 shows yet another embodiment of a calibration image projected on to the touch surface of the touch screen during calibration.

FIG. 8 shows yet another embodiment of a calibration image 200 for display during the calibration process. In this example, the rectangular calibration image 200 suffers from keystone distortion and thus, appears trapezoidal. In addition to its perimeter, the calibration image 200 includes concentric outer and inner loops 210 and 212 respectively. The outer and inner loops are rectangular but appear as trapezoids in the distorted calibration image 200. The space between the outer and inner loops 210 and 212 defines a tracing path 214. Text instructions 216 direct the user to move the pointer 68 along the tracing path 214. In this case, the confined nature of the tracing path 214 and the text instructions provide unambiguous direction (both visually and textually) as to where pointer contact and movement should be made.

Figure 9:
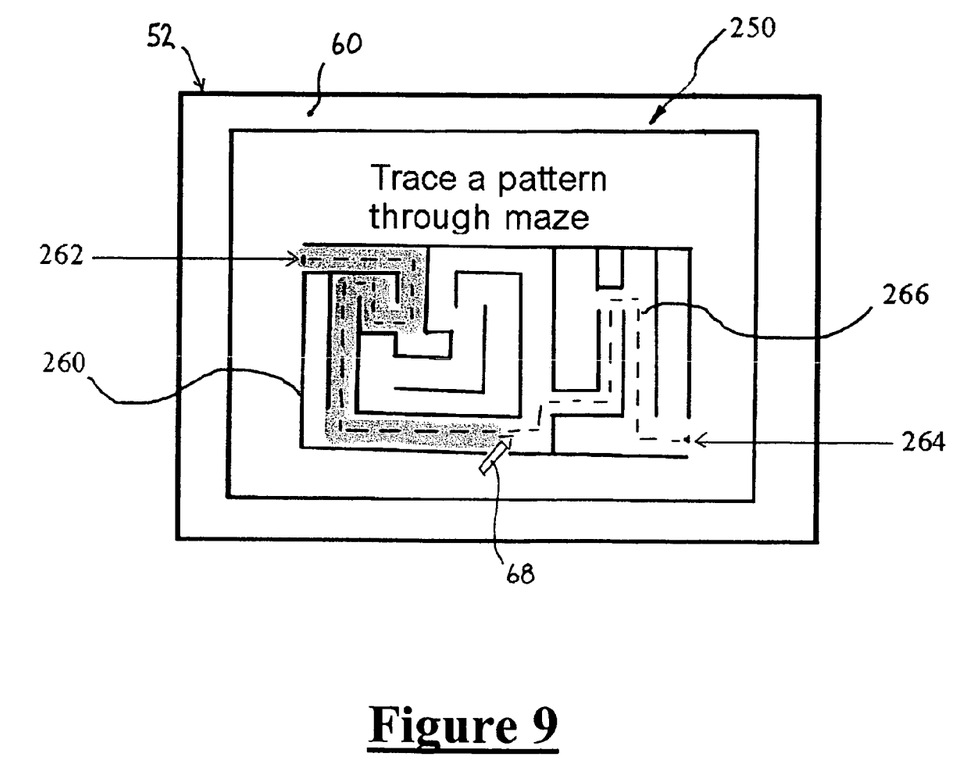
FIG. 9 shows yet another embodiment of a calibration image projected on to the touch surface of the touch screen during calibration.

FIG. 9 shows yet another embodiment of a calibration image 250 for display during the calibration process. In this example, the calibration image does not suffer from noticeable keystone distortion and thus, appears rectangular. The calibration image 250 is designed to provide a level of amusement to what some may consider a mundane task. A maze 260 is included in the calibration image 250 having known properties. As illustrated, there is only a single correct tracing path 266 that navigates through the maze from its start 262 to its finish 264.

The maze 260 presents a defined start and finish point, and thus at least two discrete pointer coordinate locations. Tracing a path through the maze 260 also generates pointer coordinates corresponding to a very complex shape. Back and forth motions, as a result of pointer movement down a wrong path within the maze 260, provide distinct information regarding the pointer location within the maze. The directional and displacement components of the traced path can be extracted and compared to a master image, providing a substantial number of identifiable pointer coordinates that can to be mapped against the known properties of the maze. A more complex maze will provide more pointer coordinates for calibrating the touch screen and computer display coordinate systems.

If desired, the maze 260 may include more than one solution allowing for a user to trace different paths that navigate through the maze from start to finish. In this case, some tracing paths will provide more calibration information and some tracing paths will provide less calibration information. Calibration may be based on slope, displacement, direction, midpoint of lines, contiguous coordinates, inflection points, etc. As with the previously described examples, paths through the maze can be traced several times to improve calibration accuracy. Alternate mazes having different tracing paths may also be presented once one maze has been completed to provide increased robustness.

Figure 10:
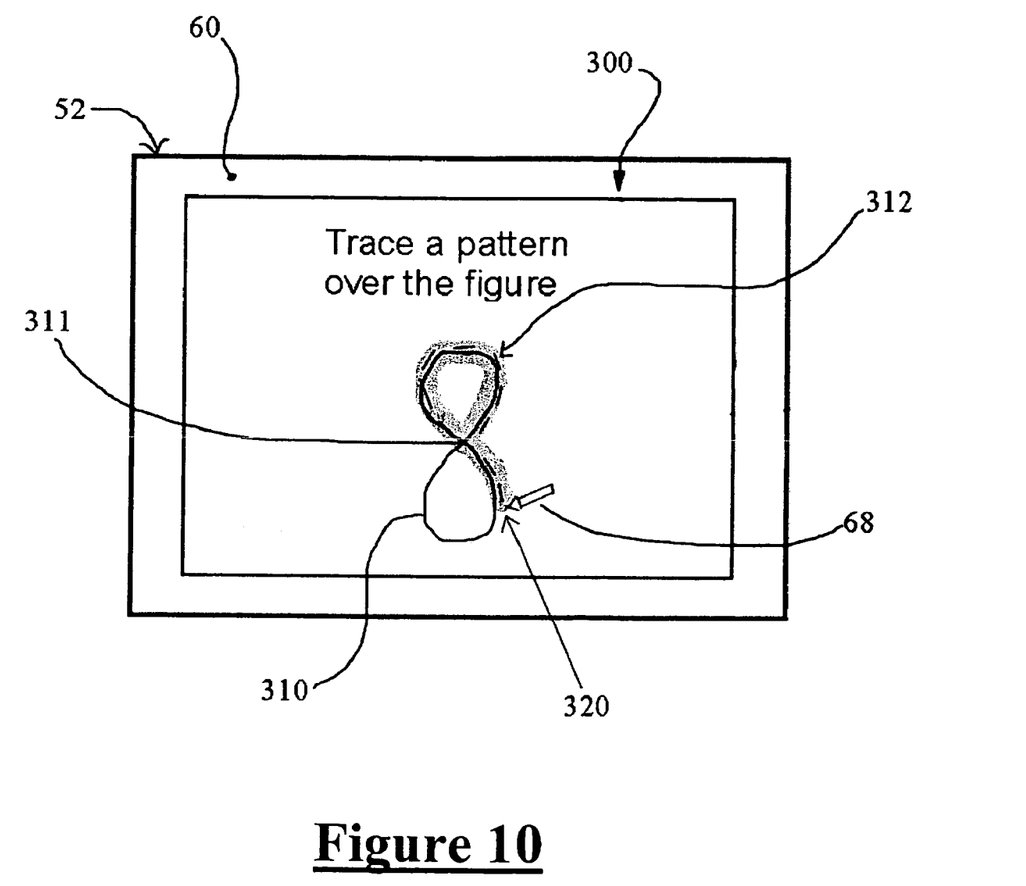
FIG. 10 shows yet another embodiment of a calibration image projected on to the touch surface of the touch screen during calibration.

FIG. 10 shows still yet another embodiment of a calibration image 300 for display during the calibration process. In this example, the calibration image 300 does not suffer from noticeable keystone distortion and thus, appears rectangular. The calibration image 300 includes a centrally disposed continuous overlapping loop in the form of an "infinity sign" or "figure-eight" 310. The user is directed to trace a path 312 along the loop 310. The beginning and end locations may be predetermined or chosen at the user's discretion.

As with certain previous embodiments, the user is only required to contact the touch surface 60 with the pointer 68 once during the calibration process. A continuous stroke is used to trace a path along the loop 310. Visual feedback such as a visual cue 320, in this case highlighting allows the user to continue tracing along the loop 310 until a sufficient degree of calibration is achieved.

Pointer coordinates reported by the touch screen 52 to the computer 56 are compared to predefined properties of the loop 310 in the calibration image 300. Pointer coordinates corresponding to the extreme top, bottom, left, and right portions of the loop 310 may be of use. The continuously changing slopes in the loop 310 are of particular use in calibration. The loop 310 also includes a discrete location 311 where the loop line crosses over itself.

Figure 11:
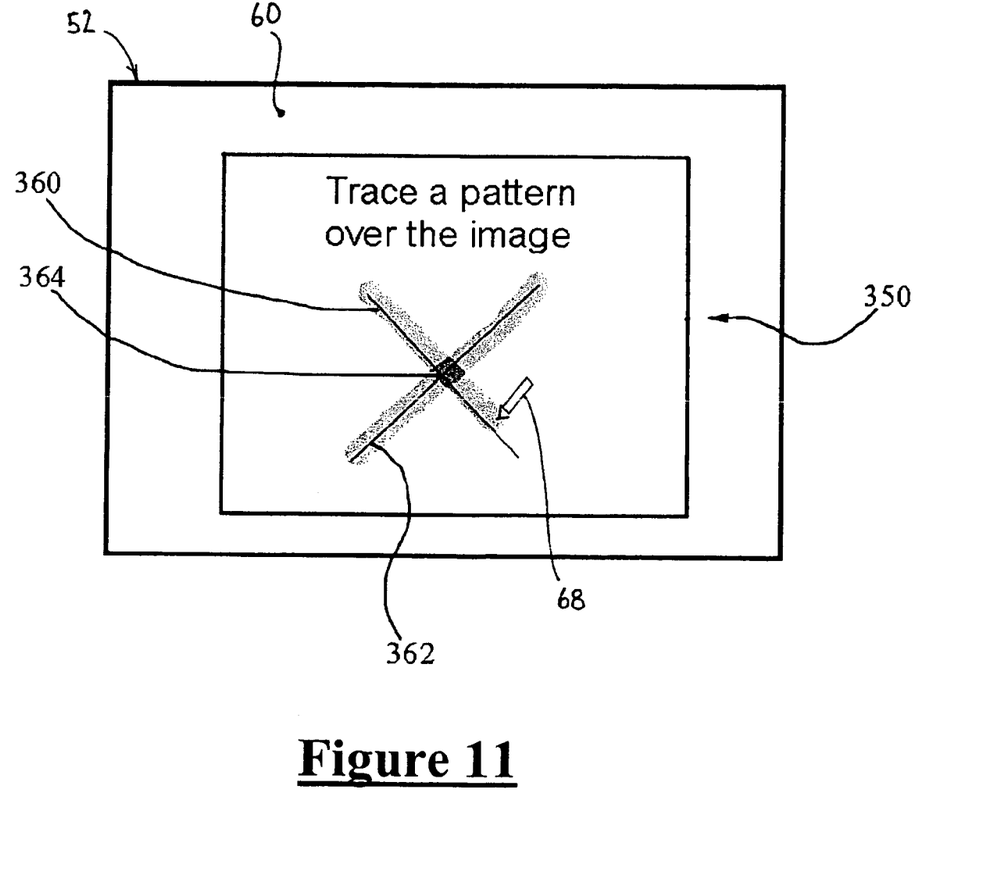
FIG. 11 shows still yet another embodiment of a calibration image projected on to the touch surface of the touch screen during calibration.

FIG. 11 shows still yet another embodiment of a calibration image 350 for display during the calibration process. In this example, the calibration image 350 does not suffer from noticeable keystone distortion and thus, appears rectangular. The calibration image 350 again utilizes two lines 360, 362. In this case the lines 360, 362 run diagonally from top left to bottom right, and top right to bottom left. The lines 360, 362 are illustrated crossing generally at the center point 364 of the calibration image 350. Tracing paths along the lines 360 and 362 require at least two discrete strokes or overlapping strokes. A user may chose to trace for instance, two straight lines crossing at the center point 364, two "v" figures meeting at the center point 364, or one continuous overlapping stroke. In each case, discrete start, end, and central points in addition to slope information can be extracted from the pointer coordinates reported by the touch surface 52 to the computer 56.

Figure 12:
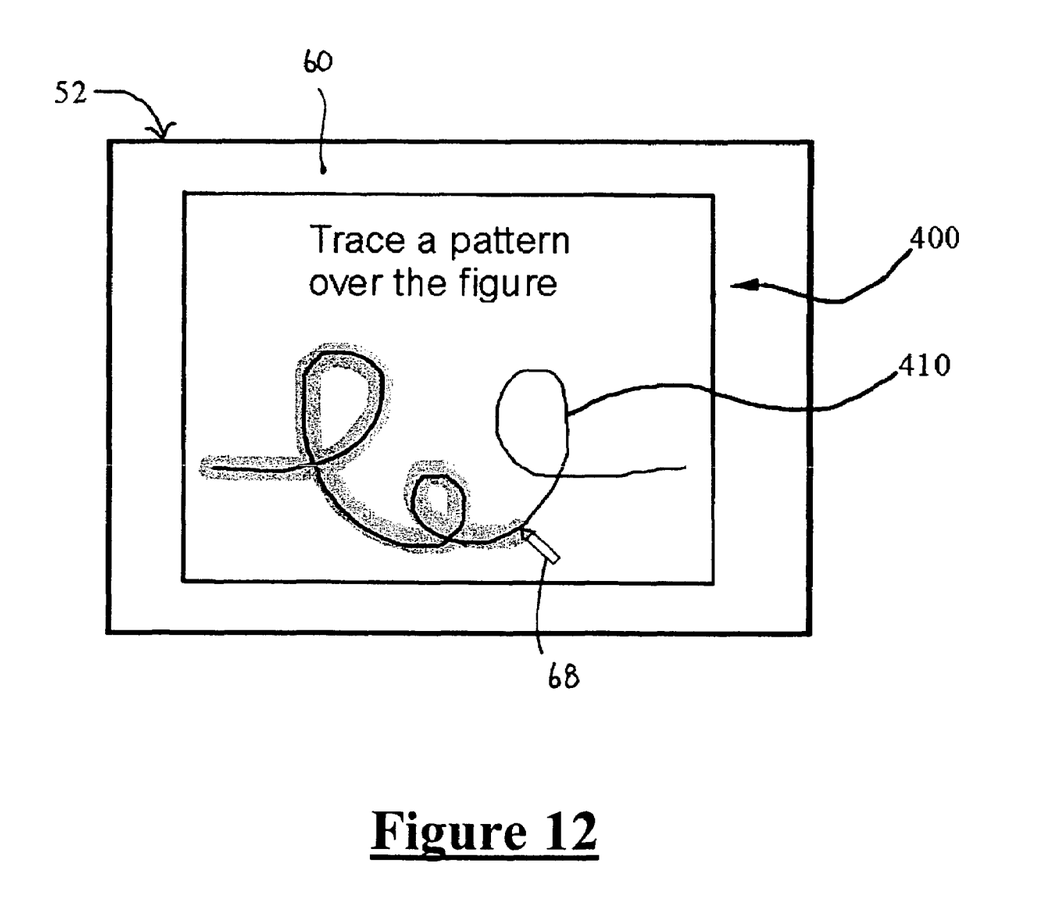
FIG. 12 shows still yet another embodiment of a calibration image projected on to the touch surface of the touch screen during calibration.

FIG. 12 shows still yet another embodiment of a calibration image 400 for display during the calibration process. In this example, the calibration image 400 does not suffer from noticeable keystone distortion and thus, appears rectangular. The calibration image 400 includes a somewhat abstract line 410. The line 410 comprises three loops extending from left to right, defining three intersection points where the line 410 crosses itself. Pointer coordinates corresponding to the start and end points of the line 410 are easily extracted. The locations where the line 410 crosses itself also provides discrete pointer coordinates. The slope of the curves within the line 410 provide further information useful in mapping the touch screen coordinate system to the coordinate system of the calibration image 400.

Figure 13:
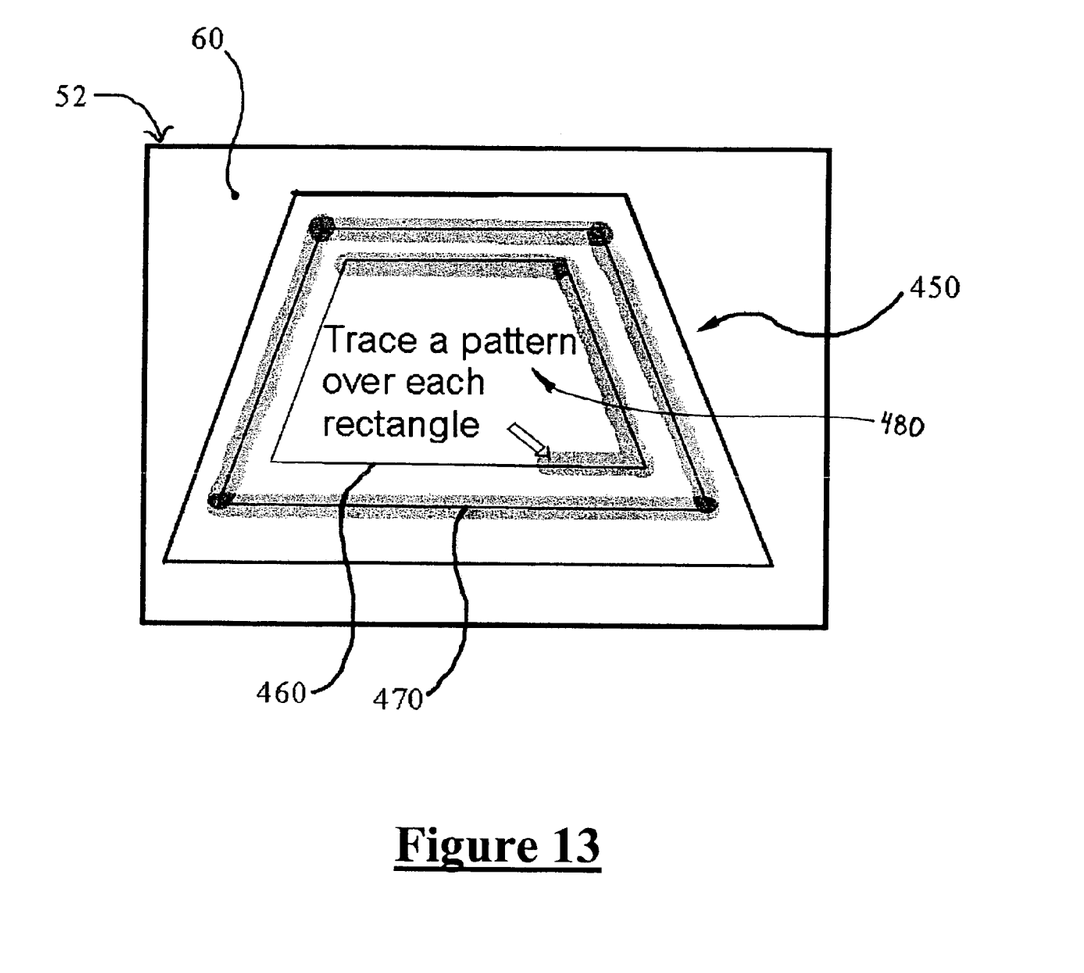
FIG. 13 shows still yet another embodiment of a calibration image projected on to the touch surface of the touch screen during calibration.

FIG. 13 shows still yet another embodiment of a calibration image 450 for display during the calibration process. The calibration image 450 is similar to that shown in FIG. 8 and suffers from keystone distortion. As a result, the calibration image 450 appears trapezoidal. Calibration image 450 includes concentric outer and inner loops 470 and 460 respectively. In this example, the outer and inner loops are rectangular but appear as trapezoids in the distorted calibration image 450. Text instructions 480 direct the user to trace paths following each loop rather than in the space between them. By providing two geometric shapes, during the calibration process an increased number of pointer coordinates for mapping the touch screen coordinate system with the coordinate system of the calibration image 450 are provided.

Various geometric shapes and patterns may be included in the calibration image to be traced by a user. Geometric shapes including squares, rectangles, trapezoids, rhombuses, circles, ovals, ellipses, and triangles provide distinctive properties from which calibration can be achieved. Various combinations of such shapes may be presented in a single calibration image.

The above-described embodiments illustrate a calibration process for interactive touch systems whereby a user traces a path presented in a calibration image using a continuous stroke. It should be understood that each path presented in the calibration image need not be traced by a single continuous stroke to enjoy the benefit of the present invention. For example, a user may trace a rectangular path using four discrete continuous strokes, one along each side of the rectangle. Each of these strokes would comprise discrete beginning and end pointer coordinates, as well as incremental pointer coordinates along the length of the strokes. With pointer coordinate data associated with the four sides of the rectangle, there is a substantial amount of pointer coordinate data available for mapping the touch screen coordinate system to the coordinate system of the projected image. Thus, a user need only trace a portion of the path presented in the calibration image with a continuous stroke in order for calibration to be effective.

The present calibration process provides advantages in that it can be utilized to calibrate an image projected on to a non-planar touch surface. The surface may be curved, hemispherical, somewhat irregular, etc. The process of using continuous pointer coordinates generated in response to pointer strokes on the touch surface, as opposed to using discrete pointer coordinates generated in response to discrete pointer contacts at predefined locations, makes calibration of an irregular touch surface possible. As will be appreciated, using prior art techniques would take a substantial number of discrete pointer contacts to accurately map a hemispherical surface. Acquiring pointer coordinates only at discrete contact locations would also likely require some foreknowledge of the geometry of the touch surface with the number of discrete pointer contacts required increasing with increased irregularity of the touch surface.

Utilizing the present invention and a calibration image such as that illustrated in FIG. 9, a significant number of pointer coordinates are gathered over a substantial area of the touch surface. These pointer coordinates can be processed individually and in relation to one another to effectively define the properties of the touch surface. The number of pointer coordinates used for calibration need not be fixed nor predetermined prior to engaging the calibration process. A non-linear process may be implemented to extract the appropriate number of pointer coordinates based on the irregularity of the touch surface.

In yet another embodiment, a user may calibrate the touch screen coordinate system without the use of a predetermined path within the calibration image. In this embodiment, the user contacts the touch surface thereby causing the touch screen 52 to generate pointer coordinates. A visual cue, such as an arrow, is generated by the computer 56 and projected on to the touch surface 60 within the calibration image at the apparent pointer contact location within the calibration image. In an uncalibrated touch system, the location of the visual cue will not likely correspond with the pointer contact location. The user while maintaining contact with the touch surface moves the pointer towards the displayed arrow. The pointer coordinates generated during the pointer movement are reported by the touch screen 52 to the computer 56. The computer 56 in turn processes the pointer coordinates and mathematically determines where the pointer is with respect to location of the visual cue in the calibration image. By having the user continuously trace a path consistent with the observed location of the visual cue, the computer will eventually calibrate the touch system so that the touch screen coordinate system and computer coordinate system are mapped.

Although the tracing paths shown in FIGS. 6, 7 and 10 to 13 are represented in the calibration images by solid continuous lines, those of skill in the art will appreciate that the tracing paths may be represented by dashed or dotted lines or by other demarcations that provide visual guidance to the user for the paths to be traced.

Although embodiments of the present invention have been described, those of skill in the art will appreciate that the variations and modifications may be made without departing from the spirit and scope thereof as defined by the appended claims.

What is claimed is:

1. A method of calibrating an interactive touch system comprising:
   moving a pointer along at least one path on a touch surface over a calibration image presented on said touch surface;
   generating pointer coordinates generally continuously during pointer movement representing pointer contact locations on said touch surface; and
   mapping the coordinate system of the touch surface to the coordinate system of the calibration image using said pointer coordinates and said calibration image.

2. The method of claim 1 wherein said calibration image includes at least one demarcation providing visual guidance with respect to said at least one path along which said pointer is to be moved.

3. The method of claim 2 wherein said demarcation is at least one line to be traced using said pointer.

4. The method of claim 3 wherein said calibration image includes a plurality of straight lines visually identifying said at least one path to be traced using said pointer.

5. The method of claim 4 wherein said plurality of straight lines are joined to form at least one geometric shape.

6. The method of claim 5 wherein said plurality of straight lines form a single geometric shape.

7. The method of claim 6 wherein said straight lines follow the perimeter of said calibration image.

8. The method of claim 5 wherein said at least one geometric shape is within the boundary of said calibration image.

9. The method of claim 8 wherein said plurality of straight lines form multiple geometric shapes.

10. The method of claim 9 wherein said multiple geometric shapes are concentric.

11. The method of claim 4 wherein at least some of said straight lines are isolated.

12. The method of claim 11 wherein all of said straight lines are isolated.

13. The method of claim 12 wherein said straight lines are generally parallel.

14. The method of claim 4 wherein at least some of said straight lines intersect.

15. The method of claim 14 wherein all of said straight lines intersect.

16. The method of claim 3 wherein said at least one line is curved.

17. The method of claim 16 wherein said at least one curved line is within the boundary of said calibration image.

18. The method of claim 17 wherein said at least one curved line forms at least one closed loop.

19. The method of claim 18 wherein the entire curved line forms a closed loop.

20. The method of claim 18 wherein said at least one curved line forms a plurality of closed loops along its length.

21. The method of claim 2 wherein said at least one tracing path is defined by the space between spaced lines.

22. The method of claim 21 wherein said spaced lines form a maze, said at least one tracing path being defined by the solution to said maze.

23. The method of claim 22 wherein said maze has a single solution.

24. The method of claim 22 wherein said maze has multiple solutions.

25. The method of claim 2 wherein said demarcation is presented in said calibration image after pointer contact with said touch surface, said demarcation representing the end point of said at least one path.

26. The method of claim 2 further comprising generating a calibrated touch surface coordinate system using said mapping.

27. The method of claim 26 further comprising storing said calibrated touch surface coordinate system in memory.

28. The method of claim 27 wherein said at least one demarcation visually identifies at least one path to be traced using said pointer, the coordinates of the demarcation in the calibration image coordinate system being used during said mapping.

29. The method of claim 28 wherein pointer coordinates corresponding to at least one discrete point along said at least one tracing path is extracted and used to enhance said mapping.

30. The method of claim 29 wherein said at least one discrete point includes at least one of the start and end points of the tracing path.

31. The method of claim 30 wherein said at least one tracing path is shaped to define at least one discrete point intermediate the start and end points of the tracing path.

32. The method of claim 31 wherein said at least one tracing path includes at least one intersection point defining said at least one intermediate discrete point.

33. The method of claim 31 wherein said at least one tracing path includes at least one inflection point defining said at least one intermediate discrete point.

34. The method of claim 28 wherein said at least one tracing path is complex, during said mapping the slope of at least a portion of said traced path being calculated using said pointer coordinates to enhance said mapping.

35. The method of claim 34 wherein pointer coordinates corresponding to at least one discrete point along said at least one tracing path is extracted and used to enhance said mapping.

36. The method of claim 35 wherein said at least one discrete point includes at least one of the start and end points of the tracing path.

37. The method of claim 36 wherein said at least one tracing path is shaped to define at least one discrete point intermediate the start and end points of the tracing path.

38. The method of claim 37 wherein said at least one tracing path includes at least one intersection point defining said at least one intermediate discrete point.

39. The method of claim 37 wherein said at least one tracing path includes at least one inflection point defining said at least one intermediate discrete point.

40. The method of claim 26 further comprising providing feedback during tracing indicating the degree of calibration of said calibrated touch surface coordinate system.

41. The method of claim 40 wherein said feedback is visual.

42. The method of claim 41 wherein said visual feedback is a highlighted path provided in said calibration image representing the perceived path of said pointer in said calibration image coordinate system.

43. The method of claim 42 wherein said at least one tracing path is complex, during said mapping the slope of at least a portion of said traced path being calculated using said pointer coordinates to enhance said mapping.

44. The method of claim 43 wherein pointer coordinates corresponding to at least one discrete point along said at least one tracing path is extracted and used to enhance said mapping.

45. The method of claim 44 wherein said at least one discrete point includes at least one of the start and end points of the tracing path.

46. The method of claim 45 wherein said at least one tracing path is shaped to define at least one discrete point intermediate the start and end points of the tracing path.

47. The method of claim 46 wherein said at least one tracing path includes at least one intersection point defining said at least one intermediate discrete point.

48. The method of claim 46 wherein said at least one tracing path includes at least one inflection point defining said at least one intermediate discrete point.

49. The method of claim 42 wherein said tracing continues until said highlighted path corresponds generally to the at least one demarcation.

50. The method of claim 28 further comprising displaying textual directions in said calibration image.

51. The method of claim 42 further comprising displaying textual directions in said calibration image.

52. A method of calibrating an interactive touch system comprising:
   displaying a calibration image on a touch surface, said calibration image specifying at least one path to be traced using a pointer;
   moving the pointer along the specified at least one tracing path;
   generating pointer coordinates generally continuously during said tracing representing pointer contact locations on said touch surface;
   mapping the coordinate system of the touch surface to the coordinate system of the calibration image using said pointer coordinates and said calibration image to calibrate the touch surface coordinate system; and
   providing feedback indicating the degree of calibration between the touch surface coordinate system and the calibration image coordinate system.

53. The method of claim 52 wherein said feedback is visual.

54. The method of claim 53 wherein during said feedback providing, a highlighted path is provided in said calibration image representing the perceived path of said pointer in said calibration image coordinate system.

55. The method of claim 54 wherein said moving continues until said highlighted path corresponds generally to the specified at least one path in said calibration image.

56. The method of claim 54 further comprising displaying textual directions in said calibration image.

57. A touch system comprising:
   a touch screen having a surface on which pointer contacts are made, said touch screen generating pointer coordinates in response to pointer contacts thereon;
   a computing device coupled to said touch screen and receiving pointer coordinates generated thereby; and
   a projection device coupled to said computing device, said projection device receiving display output from said computing device and projecting an image that is presented on said surface, wherein said computing device is operable to perform a calibration process, during said calibration process said computing device:
      providing display output to said projection device causing said projection device to project a calibration image on said surface, said calibration image being within the boundary of said surface and including at least one visual demarcation providing a guide with respect to at least one path a pointer is to be moved across said surface;
      receiving the pointer coordinates during movement of said pointer along said at least one path; and
      processing the pointer coordinates using the calibration image to map the touch screen coordinate system to the display output coordinate system thereby to calibrate said touch system.

58. A touch system according to claim 57 wherein said computing device updates the calibration image to provide visual feedback of the perceived path of said pointer in the display output coordinate system.

59. A touch system according to claim 57 wherein said calibration image specifies at least one line to be traced using said pointer.

60. A touch system according to claim 59 wherein said at least one line undergoes at least one change in direction.

61. A touch system according to claim 60 wherein said at least one line is complex.

62. A touch system according to claim 57 wherein said surface is generally planar.

63. A touch system according to claim 57 wherein said surface is non-planar.

64. A touch system according to claim 57 wherein said surface is irregular.

* * * * *